US012670301B1

(12) United States Patent
Wu et al.

(10) Patent No.: US 12,670,301 B1
(45) Date of Patent: Jun. 30, 2026

(54) FINITE ELEMENT CALIBRATION FOR STRUCTURAL LOAD IDENTIFICATION

(71) Applicant: Bentley Systems, Incorporated, Exton, PA (US)

(72) Inventors: Zheng Yi Wu, Watertown, CT (US); Peng Yin, Ladera Ranch, CA (US); Wael Elhaddad, Hercules, CA (US)

(73) Assignee: Bentley Systems, Incorporated, Exton, PA (US)

( * ) Notice: Subject to any disclaimer, the term of this patent is extended or adjusted under 35 U.S.C. 154(b) by 958 days.

(21) Appl. No.: 16/931,785

(22) Filed: Jul. 17, 2020

(51) Int. Cl.
| | |
|---|---|
| *G06F 30/23* | (2020.01) |
| *G01N 3/02* | (2006.01) |
| *G06F 3/14* | (2006.01) |
| *G06F 111/10* | (2020.01) |

(52) U.S. Cl.
CPC .............. *G06F 30/23* (2020.01); *G01N 3/02* (2013.01); *G06F 3/14* (2013.01); *G06F 2111/10* (2020.01)

(58) Field of Classification Search
CPC ........ G06F 30/23; G06F 30/25; G06F 30/367; G06F 30/398; G06F 30/20; G06F 3/14; G06F 2111/10; G01N 3/02
See application file for complete search history.

(56) References Cited

U.S. PATENT DOCUMENTS

| | | |
|---|---|---|
| 6,006,163 A | 12/1999 | Lichtenwalner et al. |
| 6,711,952 B2 | 3/2004 | Leamy et al. |

| | | |
|---|---|---|
| 7,908,095 B2 | 3/2011 | Liu et al. |
| 8,209,134 B2 | 6/2012 | Parker et al. |
| 8,285,495 B2 | 10/2012 | Purekar et al. |
| 8,387,469 B2 | 3/2013 | Okoli et al. |
| 9,983,776 B1 | 5/2018 | Wu et al. |
| 10,060,835 B1 | 8/2018 | Wu et al. |
| 10,161,749 B1 | 12/2018 | Wu et al. |

(Continued)

OTHER PUBLICATIONS

Gherlone, Marco, et al. "Shape sensing of 3D frame structures using an inverse finite element method." International Journal of Solids and Structures 49.22 (2012): 3100-3112. (Year: 2012).*

(Continued)

*Primary Examiner* — Michael Edward Cocchi
(74) *Attorney, Agent, or Firm* — Cesari and McKenna, LLP; James A. Blanchette

(57) ABSTRACT

In various example embodiments, model calibration techniques are used to identify one or more external structural loads on a structure. Initially, material or geometry attributes of elements of a model are adjusted to minimize discrepancy between measured responses and modeled responses. Thereafter, the model is used to search for external structural loads that minimize discrepancy between the measured responses and the modeled responses. Discrepancy may be measured by an error function that looks to dynamic responses and/or static responses. A solution that minimizes discrepancy may be determined using a genetic algorithm that generates a set of proposed external structural loads, applies the set to the model to produce the modeled responses, computes an error function that measures the difference between the measured responses and the modeled responses, and evolves the solutions to minimize an error produced by the error function, with such operation proceeding until a stopping criteria is reached.

20 Claims, 8 Drawing Sheets

(56)                    References Cited

U.S. PATENT DOCUMENTS

|  |  |  |  |  |
|---|---|---|---|---|
| 10,295,435 | B1 | 5/2019 | Wu et al. | |
| 10,451,416 | B1 | 10/2019 | Wu et al. | |
| 2003/0216894 | A1* | 11/2003 | Ghaboussi | G05B 13/027 |
|  |  |  |  | 703/2 |
| 2009/0048790 | A1 | 2/2009 | Geraghty et al. | |
| 2009/0133381 | A1* | 5/2009 | Holmes | G06F 30/23 |
|  |  |  |  | 701/99 |
| 2011/0029276 | A1 | 2/2011 | Cabral Martin | |
| 2012/0250004 | A1 | 10/2012 | Parker et al. | |
| 2014/0058709 | A1 | 2/2014 | Machado Viana et al. | |
| 2015/0198502 | A1 | 7/2015 | Phares et al. | |
| 2021/0287138 | A1* | 9/2021 | Chang | G06N 5/022 |

OTHER PUBLICATIONS

Perera, Ricardo, Sheng-En Fang, and Antonio Ruiz. "Application of particle swarm optimization and genetic algorithms to multiobjective damage identification inverse problems with modelling errors." Meccanica 45 (2010): 723-734. (Year: 2010).*

Sanayei, Masoud, et al. "Automated finite element model updating of a scale bridge model using measured static and modal test data." Engineering Structures 102 (2015): 66-79. (Year: 2015).*

Padmanabhan, Sanjeev, et al. "Load and boundary condition calibration using full-field strain measurement." Experimental Mechanics 46 (2006): 569-578. (Year: 2006).*

Rau, Sebastian, and Guido Morgenthal. "An assessment framework for sensor-based detection of critical structural conditions with consideration of load uncertainty." Structures. vol. 12. Elsevier, 2017. (Year: 2017).*

Betti, Michele, Luca Facchini, and Paolo Biagini. "Damage detection on a three-storey steel frame using artificial neural networks and genetic algorithms." Meccanica 50 (2015): 875-886. (Year: 2015).*

Atamturktur, Sezer, et al., "Calibration Under Uncertainty for Finite Element Models of Masonry," Los Alamos National Laboratory, LA-14414, Feb. 2010, pp. 1-132.

Croxford, A. J., et al., "Strategies for Guided-Wave Structural Health Monitoring," The Royal Society, Proceedings of the Royal Society A, vol. 463, Aug. 28, 2007, pp. 2961-2981.

Doebling, Scott, et al., "Damage Identification and Health Monitoring of Structural and Mechanical Systems from Changes in Their Vibration Characteristics: A Literature Review," Technical Report, LA-13070-MS, Los Alamos National Laboratory, NM, May 1996, pp. 1-134.

Farrar, C., et al., "Damage Detection Algorithms Applied to Experimental and Numerical Modal Dta from the 1-40 Bridge.," Technical Report, Los Alamos National Laboratory, Los Alamos, NM 87545, USA, Jan. 1996, pp. 1-135.

Michaels, Jennifer E., "Detection, Localization and Characterization of Damage in an In Situ Array of Spatially Distributed Ultrasonic Sensors," IOP Publishing Ltd., Smart Materials and Structures, vol. 17, May 14, 2008, pp. 1-15.

Sanayei, M., et al., "Damage Localization and Finite-Element Model Updating Using Multiresponse NDT Data," Journal of Bridge Engineering, 11(6), Nov. 2006, pp. 688-698.

Sanayei, Masoud, et al., "Finite Element Model Calibration of a Full Scale Bridge Using Measured Frequency Response Functions," 4th International Bridge Conference on Bridges at AmirKabir University of Technology (Tehran Polytechnic), Tehran, Iran, (4IBC2015), Conference Paper, Jan. 2015, pp. 1-8.

Siqueira, M.H.S., et al., "The Use of Ultrasonic Guided Waves and Wavelets Analysis in Pipe Inspection," Elsevier B.V., Science Direct, Ultrasonics, vol. 41, Issue 10, May 2004, pp. 785-797.

"STAAD.Pro: V8i (SELECTseries 4)—Technical Reference Manual," Bentley Systems, Incorporated, DAA037780-1/0005, Nov. 19, 2012, pp. 1-775.

U.S. Appl. No. 14/563,668, filed Dec. 8, 2014 by Zheng Yi Wu et al. for Optimizing Sensor Placement for Structural Health Monitoring, pp. 1-34.

Wang, X., et al., "Development of Dynamic-Response-Based Objective Functions for Finite-Element Modeling of Bridges," Journal of Bridge Engineering, 12(5), Sep./Oct. 2007, pp. 552-559.

Wang, X., et al., "Development of Static-Response-Based Objective Functions for Finite-Element Modeling of Bridges," Journal of Bridge Engineering, 12(5), Sep./Oct. 2007, pp. 544-551.

Wu, Z. Y., et al., "Effective Method for Locating Damage Elements by Parallel Optimization of Model Updating," Proceeding of SHMII-5, Cancun, Mexico, Dec. 11-15, 2011, pp. 1-11.

Wu, Z. Y., et al., "Generalized Framework for High Performance Infrastructure System Optimizaiton," Proceeding of International Conference on Computing and Control for Water Industry, Sep. 3-7, 2011, Exeter, UK, pp. 1-6.

Wu, Z. Y., et al., "Integrated evolutionary optimization framework for finite element model identification. First Middle East Conference on Smart Monitoring, Assessment and Rehabilitation of Civil Infrastructure," Feb. 8-11, 2011, Dubai, UAE, pp. 1-8.

Zhou, Kai, et al., "Accelerated Finite Element Model Calibration by Substructure Analysis with Parallel Genetic Algorithm Optimization," Conference Paper, The 8th International Conference on bridge Maintenance, Safety and Management, Foz do Iguacu, Brazil, Jun. 26-30, 2016, pp. 1-8.

* cited by examiner

FINITE ELEMENT CALIBRATION FOR STRUCTURAL LOAD IDENTIFICATION

BACKGROUND

Technical Field

The present disclosure relates generally to evaluating structural performance, and more specifically to structural load identification.

Background Information

Many structures (e.g., bridges, dams, buildings, and other civil infrastructure) are subject to adverse operational and environmental conditions over long service lives. To ensure safety of such structures and to maximize their service lives, it is often useful to identify what external structural loads are incident upon the structure. However, identifying external loads on a structure may be an expensive, time consuming and error prone task. For example, in the case of a bridge, external structural loads may include the weight of traffic (e.g., vehicles) that are crossing the bridge. One traditional technique for identifying such loads is to construct a weigh station (e.g., a weigh-in-motion (WIM) station that captures gross vehicle weight as vehicles drive over a measurement site). Constructing such a weigh station may involve considerable expense. Further, to accurately measure weight, vehicles may need to stop or slow (depending on the technology), consuming time. Further, sometimes vehicle weights may not be correctly recorded by the weigh station due to environmental conditions, equipment malfunction, or other issues.

A number of model-based damage detection techniques have been developed that use a comparison of modeled response and field-tested response to damaged elements. In a typical implementation, a model of a structure in healthy (i.e. un-damaged condition) is generated. The model is used to calculate modeled responses to modeled impulses. Further, a number of sensors (e.g., accelerometers) are attached to the actual structure to measure response to actual impulses. An attempt is made to detect potentially damaged members by identifying damaged elements in the model. However, while such techniques may detect damage to structures, they are generally not capable of detecting external structural loads that are incident upon the structure. External loads present unique issues that are not confronted in existing damage detection techniques.

Accordingly, there is an unmet need for techniques that are capable of identifying one or more external structural load on a structure,

SUMMARY

In various example embodiments, model calibration techniques are used to identify one or more external structural loads on a structure. Initially, material or geometry attributes of elements of a model (e.g., a finite element (FE) model) are adjusted to minimize discrepancy between measured responses and modeled responses. Thereafter, the model is used to search for external structural loads that minimize discrepancy between the measured responses and the modeled responses. Discrepancy may be measured by an error function that looks to dynamic responses and/or static responses. A solution that minimizes discrepancy may be determined using a genetic algorithm that generates a set of proposed external structural loads, applies the set to the model to produce the modeled responses, computes an error function that measures the difference between the measured responses and the modeled responses, and evolves the solutions to minimize an error produced by the error function, with such operation proceeding until a stopping criteria is reached.

In one embodiment, a method is provided for identifying one or more external structural loads on a structure. An analysis software package executing on an electronic device accesses a model of the structure that includes a plurality of elements. The analysis software package during a calibration phase receives measured responses to one or more known external structural loads from the one or more sensors coupled to the structure. The model of the structure is calibrated by adjusting material or geometry attributes of the plurality of elements to minimize discrepancy between the measured responses of the calibration phase and the modeled responses. Thereafter, during an operational phase when the structure is subject to one or more unidentified external structural loads, the analysis software package receives measured responses from the one or more sensors coupled to the structure. It searches for a set of structural loads that minimize discrepancy between measured responses and the modeled responses to identify the one or more unidentified structural loads and displays on a display screen on the electronic device indications of the set of external structural loads.

In another embodiment, an electronic device having a display screen, one or more processors, and a memory is configured to identify one or more external structural loads on a structure. The memory stores a model of the structure that includes a plurality of elements representing discrete portions of the structure, and executable instructions for a plurality of software modules that are executable on the one or more processors. The plurality of software modules include an optimization module configured to generate solutions that include a set of proposed external structural loads, and to evolve the solutions to minimize an error. They also include a calibration module configured to receive the solutions and update the model based on the solutions, and to receive modeled responses for the solutions and measured responses from one or more sensors coupled to the structure, and to compute the error using an error function that measures difference between the measured responses and the modeled responses. They further include a model solver module configured to calculate the modeled responses based on the model as updated. Still further they include a user interface module configured to display a selected solution to a user as a set of identified external structural loads.

In still another embodiment, a non-transitory electronic device-readable medium having executable instructions stored thereon is provided to identify one or more external structural loads on a structure. The instructions when executed by one or more processors access a model of the structure that includes a plurality of elements and receive measured responses from the one or more sensors coupled to the structure. They further search for external structural loads that minimize discrepancy between the measured responses and the modeled responses, the searching to iteratively generate solutions that include a set of proposed external structural loads, apply the set of proposed external structural loads to the model to produce the modeled responses, compute an error function that measures the difference between the measured responses and the modeled responses, and evolve the solutions to minimize an error produced by the error function, until a stopping criteria is reached, and the solutions at the stopping criteria are returned as the set of external structural loads. Finally, they display indications of the set of external structural loads.

It should be understood that a variety of additional features and alternative embodiments may be implemented other than those discussed in this Summary. This Summary is intended simply as a brief introduction to the reader for the further description which follows and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
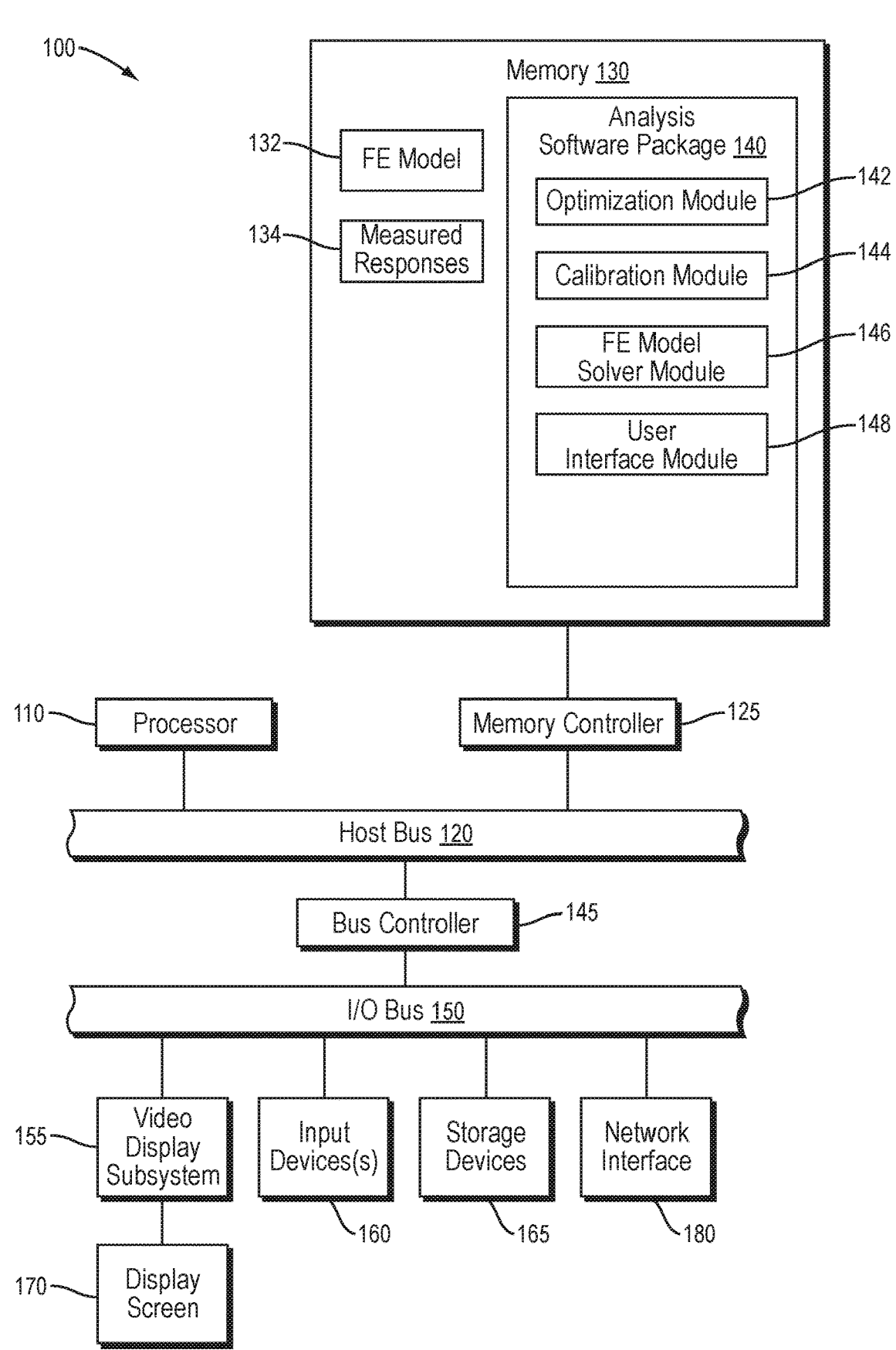
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device 100 includes at least one processor 110 coupled to a host bus 120. The processor 110 may be any of a variety of commercially available processors. A volatile memory 130, such as a Random Access Memory (RAM) is also coupled to the host bus via a memory controller 125. When in operation, the memory 130 stores processor-executable instructions and data that are provided to the processor 110. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem 155 may include a display screen 170 and hardware to drive the display screen. At least one input device 160, such as a keyboard, a touch sensor, a touchpad, a mouse, etc., is also coupled to the I/O bus 150. A persistent storage device 165, such as a hard disk drive, a solid-state drive, or another type of persistent data store, is further attached, and may persistently store the processor-executable instructions and data, which are loaded into the volatile memory 130 when needed. Still further, a network interface 180 is coupled to the I/O bus 150. The network interface enables communication over a computer network, such as the Internet, between the electronic device 100 and other electronic devices, using any of a number of well-known networking protocols. Such communication may enable collaborative, distributed, or remote computing with functionality spread across multiple electronic devices.

Working together, the components of the electronic device 100 (and other electronic devices in the case of collaborative, distributed, or remote computing) may execute instructions for an analysis software package 140 that may be used to identify a set of unidentified structural loads on a structure. The analysis software package 140 may be a single software applications, or a collection of software applications which may exchange data and otherwise interoperate.

The analysis software package 140 utilizes data including a FE model 132 that represents a structure (e.g., a bridge, building, dam, etc.) of interest, and measured responses 134 that represent field-measured data for such structure. The FE model 132 may represent the structure in terms of interconnected nodes (i.e., elements) that represent discreet portions or members of the structure. The FE model 132 may be initially arranged to be uncalibrated, and as explained in more detail below, may be calibrated to be able to identify loads having a load magnitude and a load position. The measured responses 134 may be provided from sensors (e.g., accelerometers, strain gauges, etc.) coupled to (e.g., physically attached to) various locations on the structure and measuring the reaction of the structure to external structural loads. Some of the measured responses 134 may be known external structural loads and may be used to calibrate the FE model 132. Other measured responses 134 may be unidentified external structural loads and may be used to identify such loads. The measured responses may include dynamic response, for example, modal shapes and modal frequencies, and/or static responses, for example, displacements, strains, etc.

The analysis software package 140 includes a number of modules, such as an optimization module 142, a calibration module 144, a FE model solver module 146, and a user interface module 148. As discussed in more detail below, the optimization module 142 may be configured to generate solutions that include a proposed sets of external structural loads, and to evolve the solutions until a stopping criteria is reached. In one implementation, the optimization module 142 is a generic optimization framework, such as the Darwin Optimization Framework available from Bentley Systems Inc. of Exton Pennsylvania, which employs a genetic algorithm that relies upon an evaluation criteria to evolve the solutions.

The calibration module 144 may be configured to receive the generated solutions, and to update the FE model 132 based on the solutions. The calibration module 144 may also operate to receive modeled responses for the solutions and the measured responses 134, and to calculate an error function that is used as an evaluation criteria by the optimization module 142.

The FE model solver module 146 may be configured to calculate modeled responses that are provided to the calibration module 144, based on the FE model 132 and calibrated versions thereof. In one implementation, the FE model solver module 146 is a finite element solver library, such as the OpenSTAAD library available from Bentley Systems Inc. of Exton Pennsylvania.

Finally, the user interface module 148 may be configured to display indications (e.g., text, graphics, etc.) on the display screen 170 of the progress of calibration/identification, as well as final solutions received from the calibration module 144, including identifications of external structural loads incident on the structure. The final solutions may be those reached when the stopping criteria are met.

The analysis software package 140 and its modules 142-148 may operate to calibrate the FE model 132 and identify external structural loads on the structure. The technique may be premised upon an external structural load identification formulation. Let vector $\vec{X}$ represent load magnitude and $\vec{P}$ represent load position. The formulation may be characterized as:

Search for:

$$(\vec{X}, \vec{P}) = (x_1, x_2, x_3, \ldots, x_N, p_1, p_2, p_3, \ldots, p_N \tag{1}$$

Minimize: $E_T$ (2)

Subject to: $x_i^{min} \leq x_i \leq x_i^{max}$, $i = 1, 2, 3 \ldots, N p_i \in ID$ (3)

where N is the i-th identified structural load, $x_i$, i=1, . . . , N is the i-th structural load magnitude, $p_i$, i=1, . . . , N is the i-th load position, $E_T$ is an error function that is used for evaluating goodness of fit between the FE model 132 and the structure as physically tested, $$x_i^{min}$$

and $$x_i^{max}$$

are the minimum and maximum limits of structural load magnitude respectively, and ID represents the set of all the elements in the FE model. With such a formulation, multiple loads can be considered simultaneously.

To effectively calibrate the FE model 132 and identify external structural loads on the structure, the evaluation criteria for equation (2) may be selected such that the error function reduces the impact of uncertainty in the FE model 132 and of noise in the measured responses. In one implementation, the impact is reduced by using as the evaluation criteria an error function based on discrepancy (i.e. difference) between modeled responses and measured responses.

The discrepancy may be evaluated by considering dynamic response or static responses. For example, for dynamic responses the error function may consider modal shape difference and modal frequency difference calculated as:

$$E_T = \sum_{i=1}^{m} (\|\Phi_i^M - \Phi_i^A\|)^2 + \alpha \sum_{i=1}^{m} (\|f_i^M - f_i^A\|)^2 \tag{5}$$

where $E_T$ is the difference between measured and modeled data, $$\Phi_i^M$$

and $$\Phi_i^A$$

are modeled modal shape i and measured modal shape i respectively, and $$f_i^M$$

and $$f_i^A$$

are modeled modal frequency i and measured modal frequency i.

Likewise, for static responses the error function may consider displacement calculated as:

$$E_T = \sum_{i=1}^{m} ((\|d_i^M - d_i^A\|)^2)^2 \tag{6}$$

where $E_T$ is the difference between measured and modeled data, and $$d_i^M$$

and $$d_i^A$$

are modeled displacement i and measured displacement i, respectively.

Similarly, for static responses the error function may consider strain calculated as:

$$E_T = \sum_{i=1}^{m} (\|\varepsilon_i^M - \varepsilon_i^A\|)^2 \tag{7}$$

where $E_T$ is the difference between measured and modeled data and $$\varepsilon_i^M$$

and $$\varepsilon_i^A$$

are modeled displacement i and measured displacement i, respectively.

Figure 2:
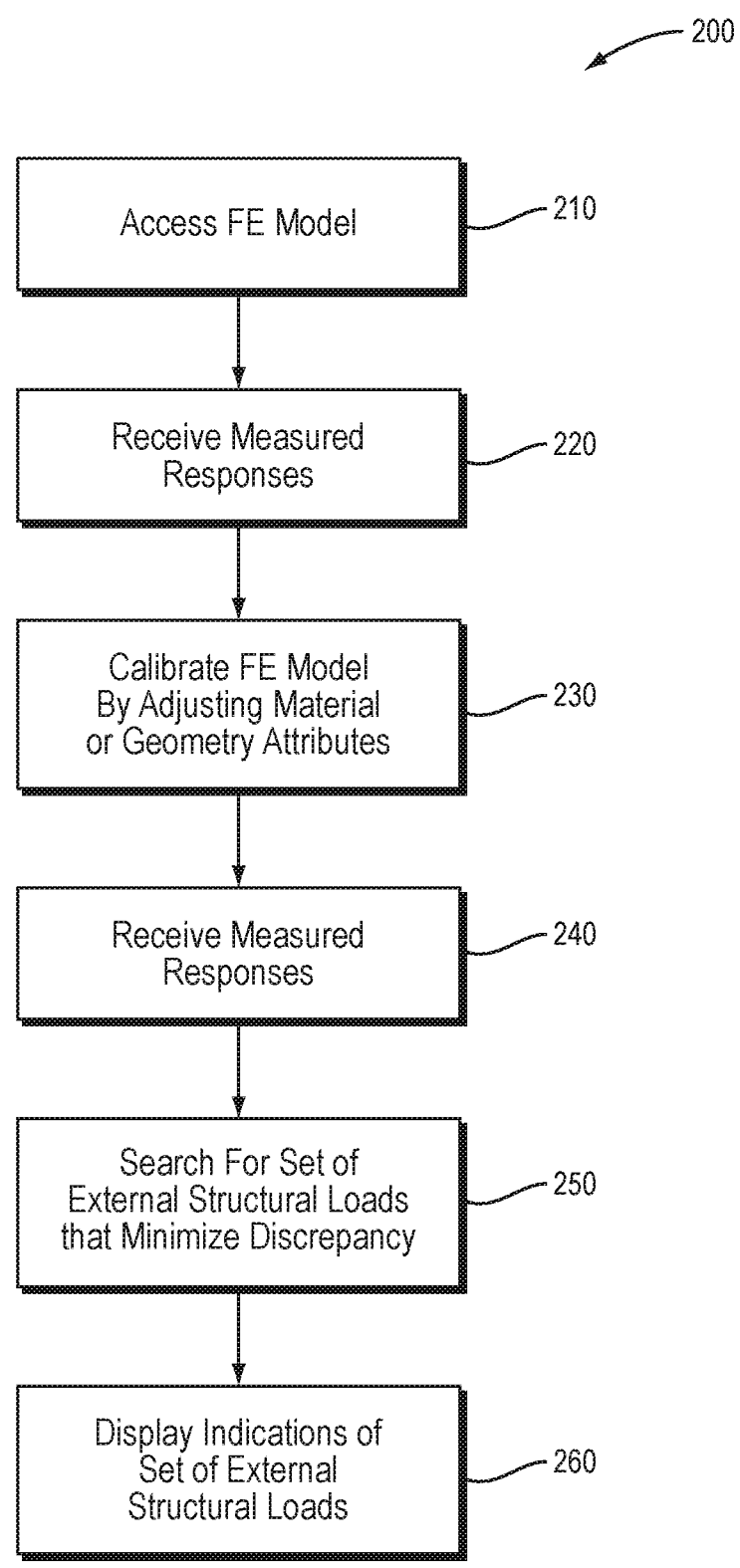
FIG. 2 is a flow diagram of an example generalized sequence of steps that may be implemented to solve an external structural load identification formulation to first calibrate a FE model and then use the FE model to search for unidentified external structural loads.

The external structural load identification formulation is an implicit optimization problem with decision variables that may be solved by the analysis software package 140 and its modules 142-148. FIG. 2 is a flow diagram of an example generalized sequence of steps 200 that may be implemented to solve the external structural load identification formulation to first calibrate the FE model 132 and then use the FE model 132 to search for unidentified external structural loads. The generalized sequence of steps omits interactions between the modules 142-148 to focus on the overall operation. At step 210, the analysis software package 140 accesses the FE model 132, which may be previously built. At step 220, during a calibration phase, the analysis software package 140 receives measured responses 134 to one or more known external structural loads. The receipt may take the form of accessing measured responses 134 in the memory 130, that were supplied by sensors coupled to the structure. At step 230, the analysis software package 140 calibrates the FE model 132 of the structure by adjusting material or geometry attributes of the plurality of elements to minimize discrepancy between the measured responses of the calibration phase and the modeled responses, using the external structural load identification formulation provided above. After the FE model 132 has been subject to this initial calibration using known data, it may be used to identify unidentified external structural loads.

At step 240, during an operation phase, the analysis software package 140 receives measured responses 134 to one or more unidentified external structural loads. Again, the receipt may take the form of accessing measured responses 134 in the memory 130, that were supplied by sensors coupled to the structure. At step 250, the analysis software package 140 uses the FE model 132 to search for a set of external structural loads that minimize discrepancy between the measured responses of the operational phase and the modeled responses, using the external structural load identification formulation provided above. At step 260, the analysis software package 140 displays indications of the set of external structural loads. Thereafter, based on the displayed indications, personnel may evaluate performance of the structure, for example, determine whether the external structural loads are compliant with limits for the structure and/or whether the structure is reacting as predicted to the external structural loads.

Figure 3:
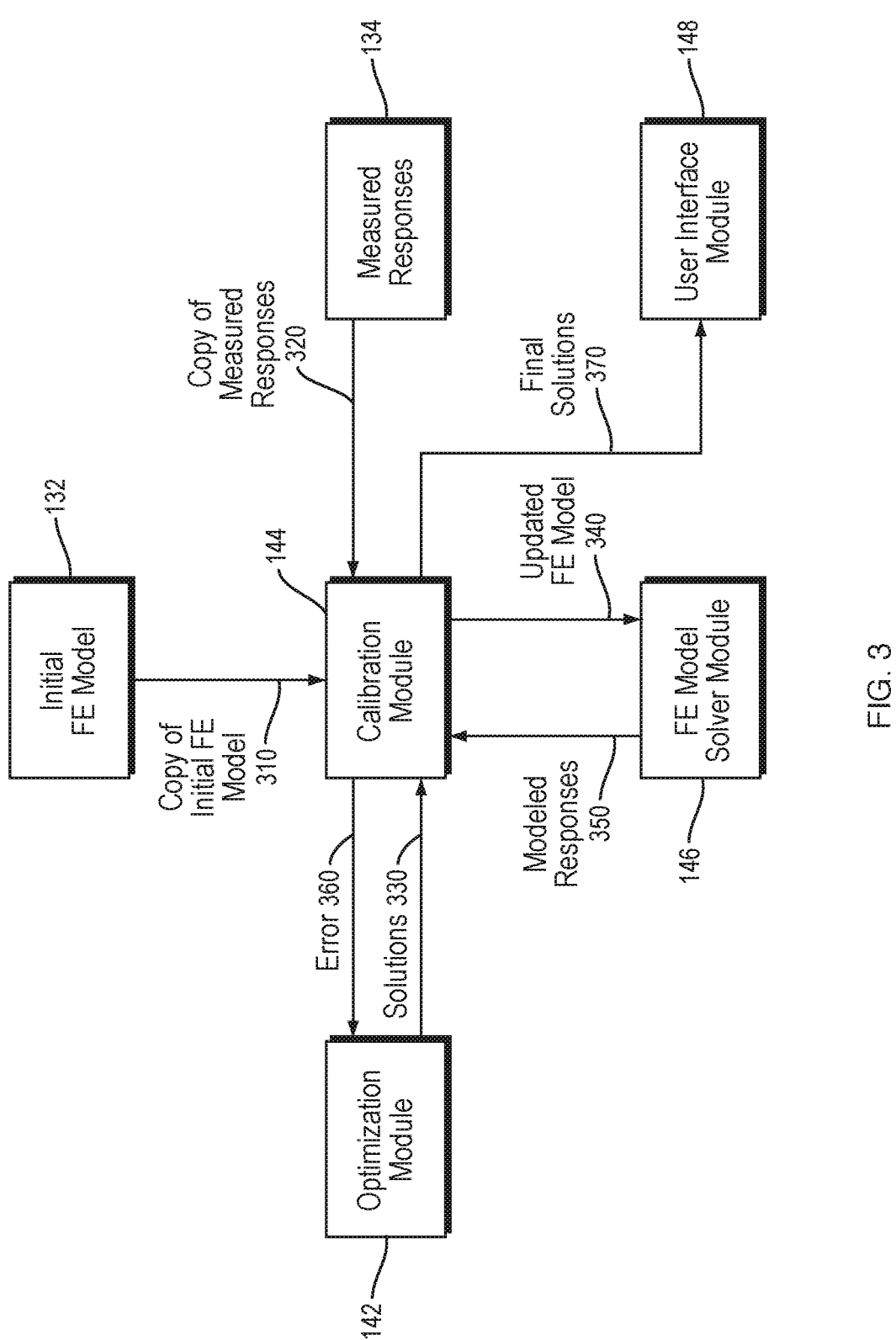
FIG. 3 is a diagram showing example interactions between modules of an analysis software package that may occur to implement the generalized steps of FIG. 2, as part of using the FE model to search for unidentified external structural loads.

FIG. 3 is a diagram showing example interactions between modules 142-148 of the analysis software package 140 that may occur to implement the generalized steps of FIG. 2, as part of using the FE model 132 to search for unidentified external structural loads. The calibration module 144 receives 310 the FE model 132 and receives 320 the measured responses 134 from the operational phase, and calls (not shown) the optimization module to generate solutions that include a proposed set of external structural loads. The optimization module 142 generates the solutions and provides 330 the solutions back to the calibration module 144. The calibration module 144 updates the FE model 132 with the proposed set of external structural loads and provides 340 the updated FE model to the FE model solver module 146. The FE model solver module 146 analyzes the updated FE model to calculate modeled responses and provides 350 the modeled responses to the calibration module 144. The calibration module 144 uses the received modeled responses and the measured responses it previously received to calculate an error function based on discrepancy between modeled response and measured response. An error produced by the error function is provided 360 to the optimization module 142, which evolves the solutions to minimize the error. The process is iteratively repeated until a stopping criteria is reached. The stopping criteria may be a maximum number of solutions generated by the optimization module 142, a maximum computation time that the modules are allowed to iterate or a minimum error being reached. When the stopping criteria is reached, the solutions are returned 370 to the user interface module 148, which may display them.

Figure 4:
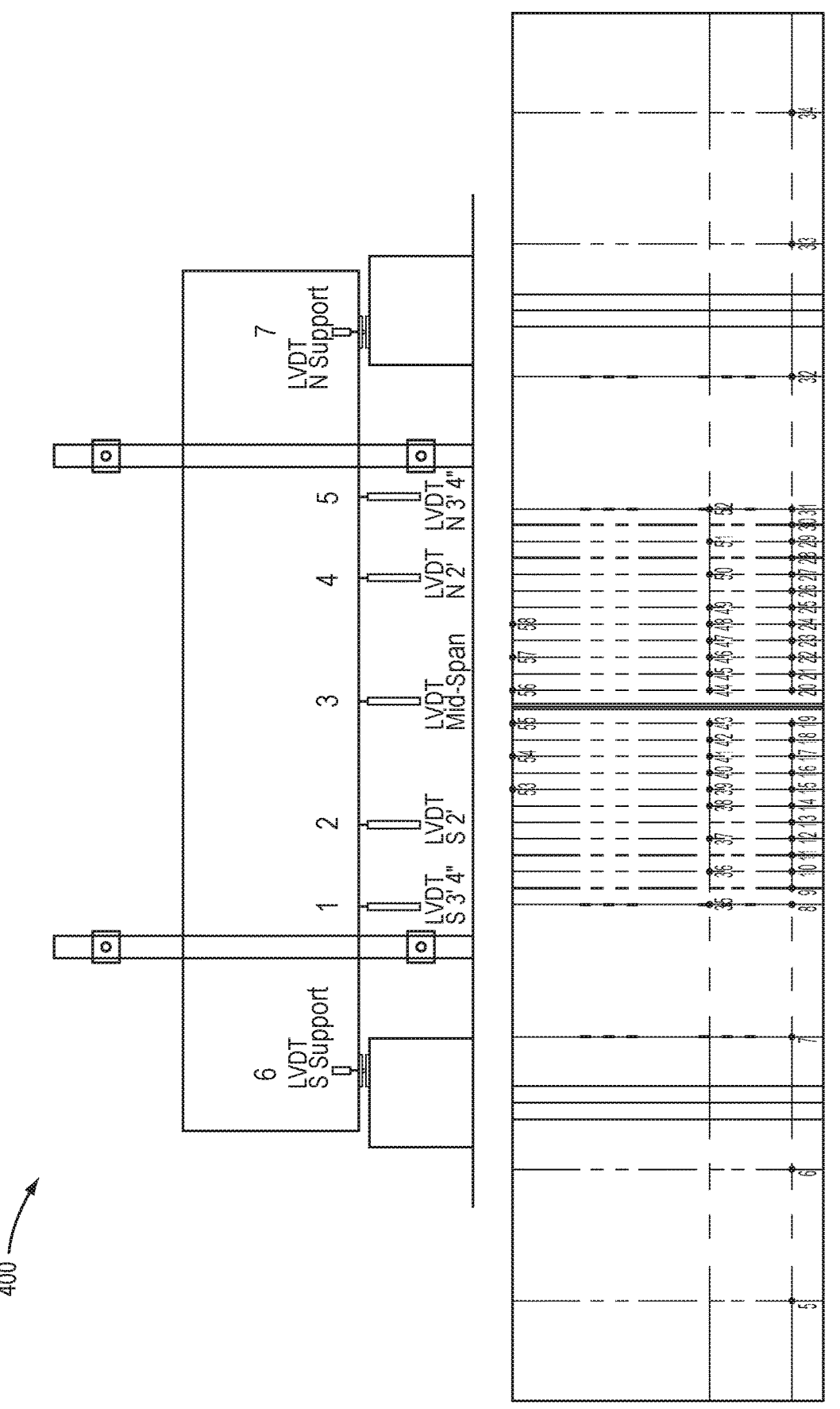
FIG. 4 is a diagram of an example structure, specifically a concrete wall spanning between supports.

Operation of the external structure load identification techniques may be demonstrated by reference to an example structure. FIG. 4 is a diagram 400 of an example structure, specifically a concrete wall spanning between supports. Four out-of-plane braces are included. External structural load is applied in the example at mid-span using two post tensioning threaded rods and two hydraulic rams. Response thereto is measured in terms of mid-span deflection by a sensor. While this example structure, loads and sensor configuration is quite simple, it should be understood that the external structure load identification technique may be applied to highly complex structures subject to numerous external structural loads and equipped with more complicated sensor arrangements.

Figure 5:
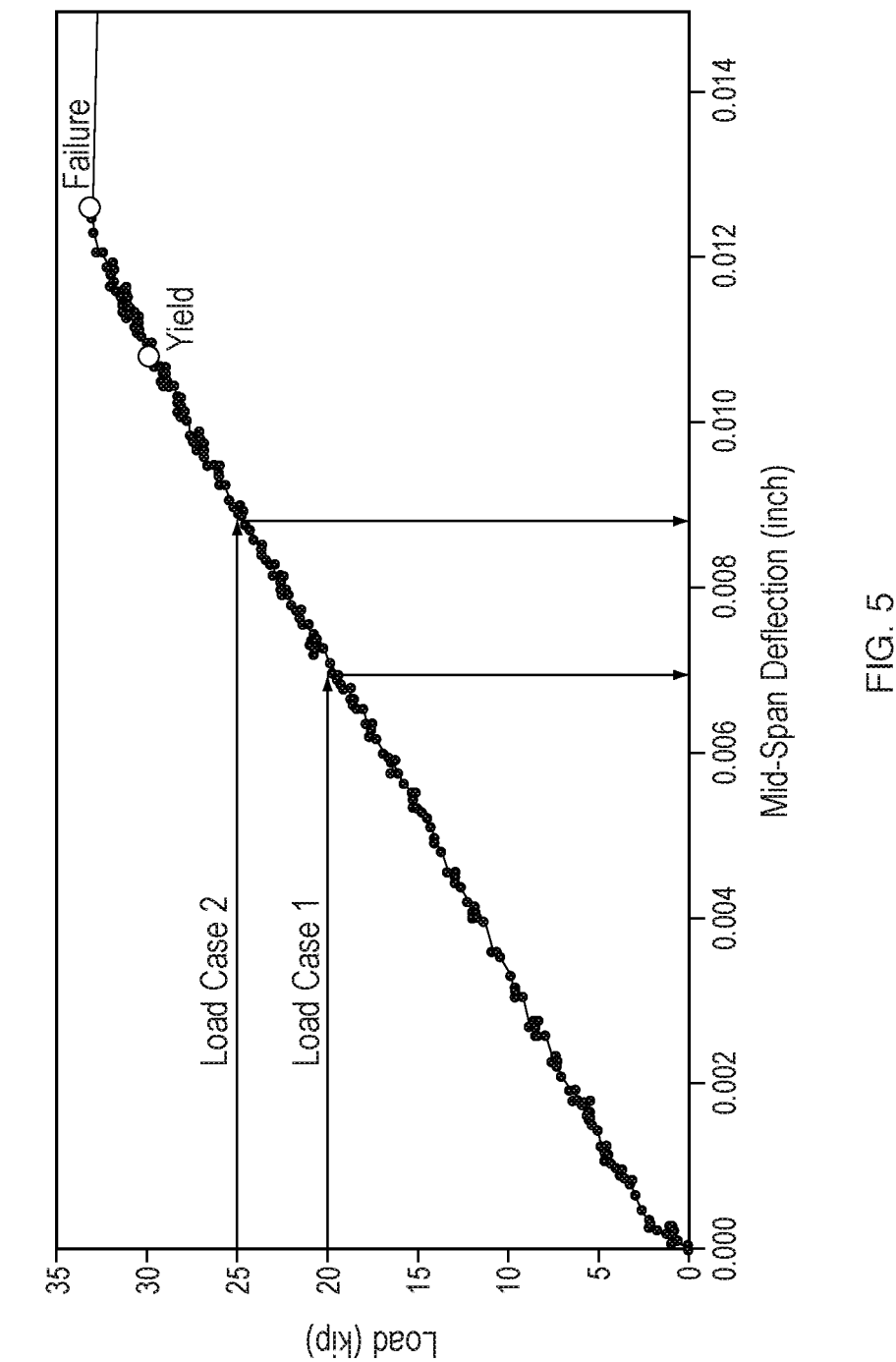
FIG. 5 is a load-deflection chart for the example structure of FIG. 4, showing deflection measured in response to applied external structural load.
Figure 6:
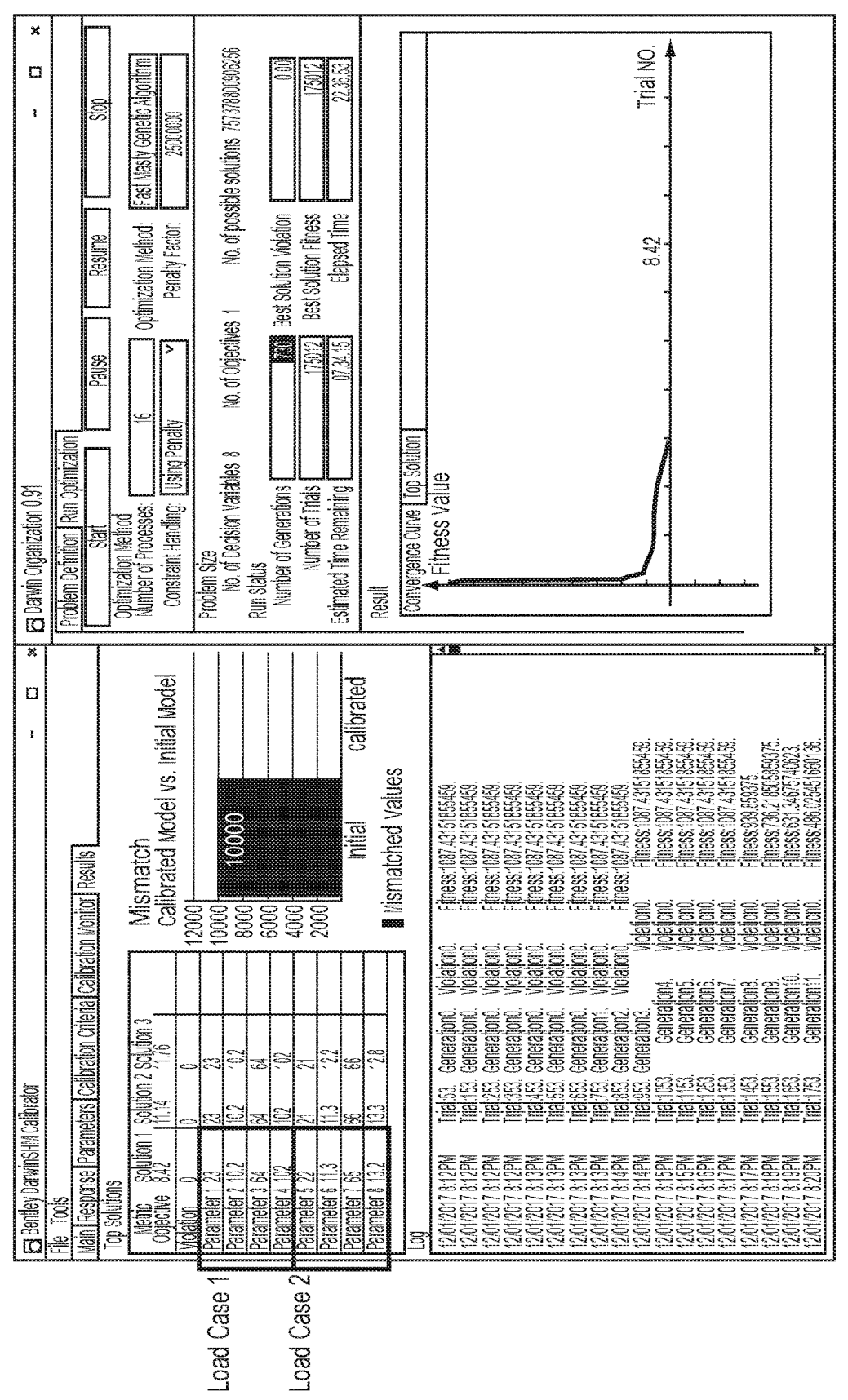
FIG. 6 is an example user interface screen of the analysis software package.
Figure 7:
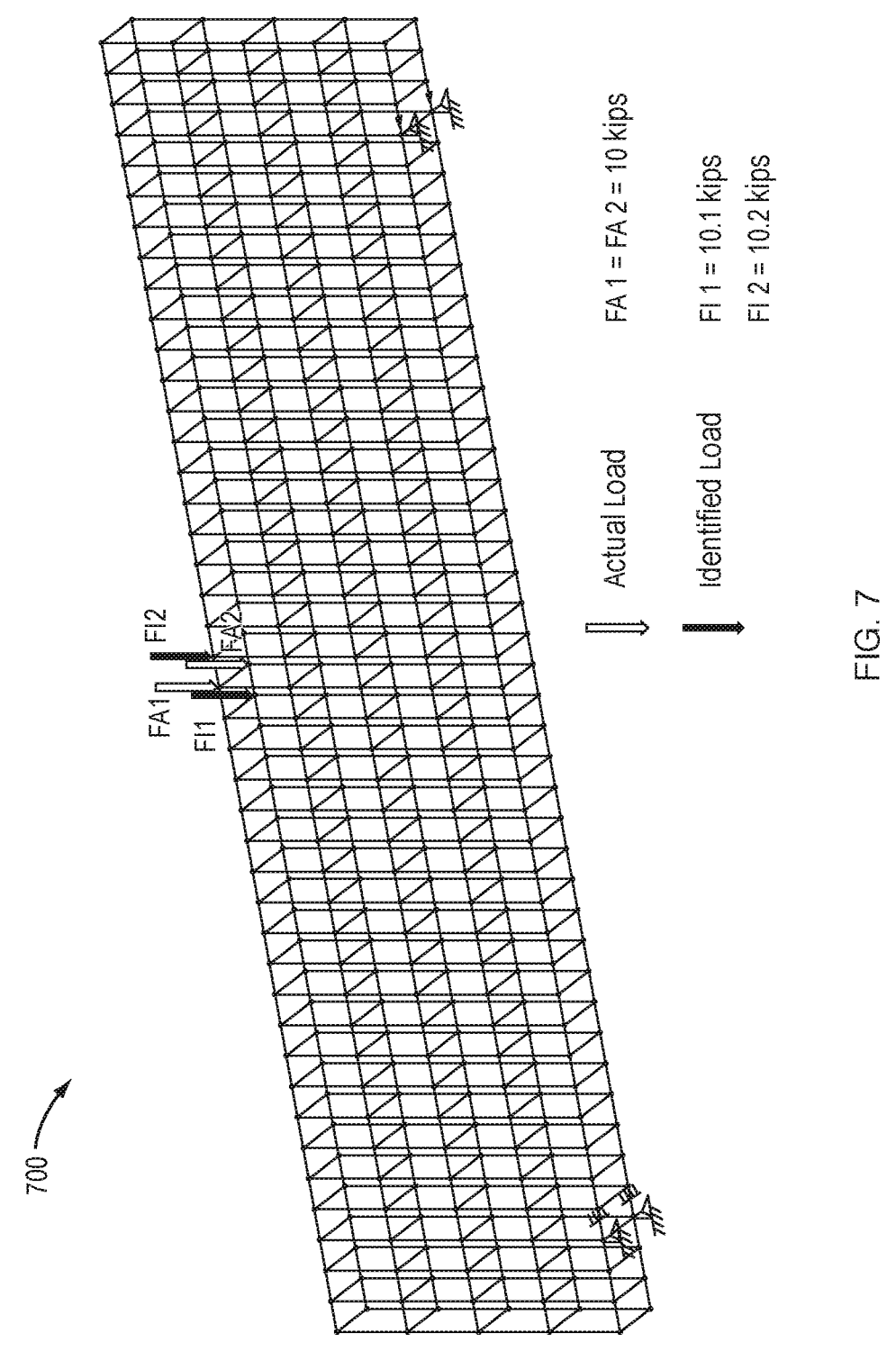
FIG. 7 is a diagram illustrating example validation of load identification results for first load case.
Figure 8:
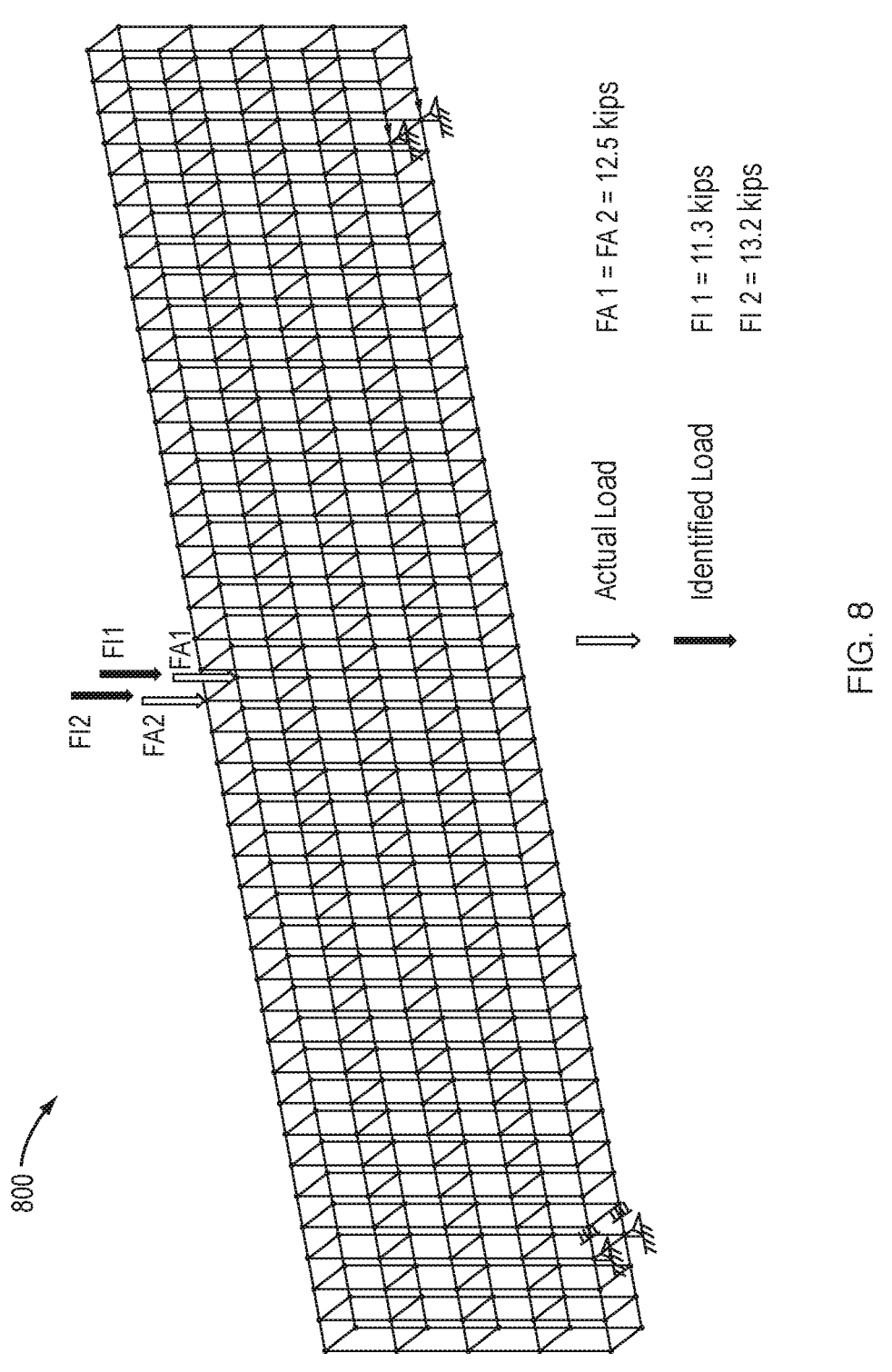
FIG. 8 is a diagram illustrating example validation of load identification results for a second load case.

FIG. 5 is a load-deflection chart 500 for the example structure of FIG. 4 showing deflection measured in response to applied external structural load. In this example, deflection measurements corresponding to 20 kips (Load Case 1) and 25 kips (Load Case 2) from this chart were selected for validating load identification results of the analysis software package 140. FIG. 6 is an example user interface screen 600 of the analysis software package 140. When supplied with measured response from FIG. 5, the analysis software package 140 produces a set of external structural loads that minimize discrepancy between the measured responses and modeled responses. As the searching converges on a solution, the value produced by the error function that evaluates goodness of fit shrinks. In the right-hand portion of the screen 600, the value is shown decreasing from 10,000 to 8.42, which indicates good convergence. In the left-hand portion of the screen 600, load magnitude and a load position for Load Case 1 and Load Case 2 are shown. FIG. 7 is a diagram 700 illustrating example validation of load identification results for Load Case 1. FIG. 8 is a diagram 800 illustrating example validation of load identification results for Load Case 2. In both figures, the actual and identified external structural loads are shown divided between two nodes of the FE model that are proximate the actual location where the load is applied. As may be observed, the identified load magnitude and load position approximate the actual load magnitude and load position, illustrating a successful identification.

In summary, the above-described techniques for identify one or more external structural loads on a structure may offer several improvements over traditional techniques, for example, techniques involving weigh stations. It should be understood that various adaptations and modifications may be made to the improved technique, to suit various implementations. While a software-based implementation is discussed above, it should be understood that the technique, at least in part, may be implemented in hardware. In general, a variety of software-based implementations, hardware-based implementations, and combinations thereof are contemplated. A software-based implementation may include electronic device-executable instructions stored in a non-transitory electronic device-readable medium, such as a volatile or persistent memory, a hard-disk, a compact disk (CD), or other storage medium. A hardware-based implementation may include specially configured processors, logic circuits, application specific integrated circuits, and/or other types of hardware components. Further, a combined implementation may include both electronic device-executable instructions stored in a non-transitory electronic device-readable medium, as well as one or more specially configured hardware components.

In general, it should be understood that the above descriptions are meant to be taken only by way of example and are not intended to limit the scope of the invention.

What is claimed is:

1. A method of identifying one or more unidentified external structural loads on a structure, comprising:

accessing, by an analysis software package executing on an electronic device, a model of the structure that includes a plurality of elements;

measuring, by one or more sensors coupled to the structure during a calibration phase, responses to one or more known external structural loads;

calibrating the model of the structure, by the analysis software package during the calibration phase, by adjusting material or geometry attributes of the plurality of elements and producing modeled responses from the model to minimize discrepancy between the measured responses and the modeled responses of the calibration phase;

measuring, by the one or more sensors, during an operational phase when the structure is subject to one or more unidentified external structural loads, responses to the one or more unidentified external structural loads;

searching, by the analysis software package during the operational phase using the calibrated model of the structure, for a set of external structural loads between a minimum limit of structural load and a maximum limit of structural load that minimize a discrepancy between the measured responses to the one or more unidentified external structural loads from the one or more sensors and modeled responses produced from the calibrated model in the operational phase, wherein the searching includes:

using a genetic algorithm to generate a set of proposed external structural loads, producing modeled responses to the set of proposed external structural loads using the calibrated model, measuring the discrepancy between the measured responses to the one or more unidentified external structural loads and the modeled responses from the calibrated model, using the genetic algorithm to evolve the set of proposed external structural loads over a plurality of iterations that reduce the discrepancy, iteratively repeating the using the genetic algorithm to generate, the producing modeled responses from the calibrated model, the measuring the discrepancy, and the using the genetic algorithm to evolve until a stopping criteria is reached, and returning the set of proposed external structural loads when the stopping criteria is reached; and displaying on a display screen on the electronic device indications of the set of external structural loads as identified external structural loads on the structure.

2. The method of claim 1, wherein the discrepancy between the measured responses from the one or more sensors and the modeled responses produced from the calibrated model in the operational phase is evaluated by measuring a difference between the measured responses and the modeled responses in the operational phase, and the measured responses and the modeled responses in the operational phase each are dynamic responses, displacement responses, or strain responses.

3. The method of claim 2, wherein the measured responses from the one or more sensors and the modeled responses produced from the calibrated model in the operational phase each are dynamic responses, and the measuring measures a difference between measured modal shape and modeled modal shape, and a difference between measured modal frequency and modeled modal frequency.

4. The method of claim 2, wherein the measured responses from the one or more sensors and the modeled responses produced from the calibrated model in the operational phase each are displacement responses, and the measuring measures a difference between measured displacement and modeled displacement.

5. The method of claim 2, wherein the measured responses from the one or more sensors and the modeled responses produced from the calibrated model in the operational phase each are strain responses, and the measuring measures a difference between measured strain and modeled strain.

6. The method of claim 1, wherein the model is a finite element (FE) model and each element is represented as a node in the FE model.

7. The method of claim 1, wherein the set of identified external structural loads includes multiple external structural loads that each have a load magnitude and a load position.

8. The method of claim 1, wherein each evolved set of proposed external structural loads is a solution and the discrepancy between the measured responses to the one or more unidentified external structural loads and the modeled responses from the calibrated model is an error, and the stopping criteria is a maximum number of solutions, a maximum computation time or a minimum error.

9. The method of claim 1, further comprising:

determining, based on the displayed identified external structural loads, whether the identified external structural loads are compliant with limits for the structure to ensure safety of the structure.

10. A system comprising:

one or more sensors coupled to a structure;

a display screen;

one or more processors; and a memory configured to store a model of the structure that includes a plurality of elements representing discrete portions of the structure, and executable instructions for a plurality of software modules that are executable on the one or more processors, the plurality of software modules including:

an optimization module configured to use a genetic algorithm to generate a set of proposed external structural loads on the structure between a minimum limit of structural load and a maximum limit of structural load, to evolve the set of proposed external structural loads over a plurality of iterations that reduce a difference between measured responses from the one or more sensors and modeled responses from the model until a stopping criteria is reached, and to return a set of external structural loads when the stopping criteria is reached;

a calibration module configured to receive the set of proposed external structural loads and apply the set of proposed external structural loads to the model, and to receive modeled responses for the set of proposed external structural loads from the model and to receive measured responses from the one or more sensors coupled to the structure, and to measure the difference between the measured responses from the one or more sensors and the modeled responses from the model;

a model solver module configured to produce the modeled responses based on the model; and a user interface module configured to display the set of external structural loads to a user as a set of identified external structural loads on the structure.

11. The system of claim 10, wherein the measured responses from the one or more sensors and the modeled responses from the model each are dynamic responses, and the calibration module measures a difference between measured modal shape and modeled modal shape, and a difference between measured modal frequency and modeled modal frequency.

12. The system of claim 10, wherein the measured responses from the one or more sensors and the modeled responses each are displacement responses, and the calibration module measures a difference between measured displacement and modeled displacement.

13. The system of claim 10, wherein the measured responses from the one or more sensors and the modeled responses from the model each are strain responses, and the calibration module measures a difference between measured strain and modeled strain.

14. The system of claim 10, wherein each evolved set of proposed external structural loads is a solution, and difference between the measured responses from the one or more sensors and the modeled responses from the model is an error, and the stopping criteria is a maximum number of solutions, a maximum computation time or a minimum error.

15. A non-transitory electronic device-readable medium having executable instructions stored thereon, the instructions when executed by one or more processors being operable to:

access a model of a structure that includes a plurality of elements;

measure responses using one or more sensors coupled to the structure;

search for external structural loads between a minimum limit of structural load and a maximum limit of structural load that minimize discrepancy between the measured responses from the one or more sensors and modeled responses from the model, the search to use a genetic algorithm to generate a set of proposed external structural loads, apply the set of proposed external structural loads to the model to produce the modeled responses, measure a difference between the measured responses from the one or more sensors and the modeled responses from the model, and use the genetic algorithm to evolve the set of proposed external structural loads though a plurality of iterations to minimize difference between the measured responses and the modeled responses, the evolution to occur until a stopping criteria is reached, and the set of proposed external structural loads at the stopping criteria are returned as a set of external structural loads; and display indications of the set of external structural loads as identified external structural loads on the structure.

16. The non-transitory electronic device-readable medium of claim 15, wherein the measured responses from the one or more sensors and the modeled responses from the model each are dynamic responses, and the instructions when executed measure a difference between measured modal shape and modeled modal shape, and a difference between measured modal frequency and modeled modal frequency.

17. The non-transitory electronic device-readable medium of claim 15, wherein the measured responses from the one or more sensors and the modeled responses from the model each are displacement responses, and the instructions when executed measure a difference between measured displacement and modeled displacement.

18. The non-transitory electronic device-readable medium of claim 15, wherein the measured responses from the one or more sensors and the modeled responses from the model each are strain responses, and the instructions when executed measure a difference between measured strain and modeled strain.

19. The non-transitory electronic device-readable medium of claim 15, wherein the model is a finite element (FE) model and each element is represented as a node in the FE model.

20. A method of identifying one or more unidentified external structural loads on a bridge or building and ensuring safety compliance of the bridge or building, comprising:

accessing, by an analysis software package executing on an electronic device, a model of the bridge or building that includes a plurality of elements;

measuring, by one or more sensors coupled to the bridge or building during a calibration phase, responses to one or more known external structural loads on the bridge or building;

calibrating the model of the bridge or building, by the analysis software package during the calibration phase, by adjusting material or geometry attributes of the plurality of elements and producing modeled responses from the model to minimize discrepancy between the measured responses and the modeled responses of the calibration phase;

displaying on a display screen on the electronic device indications of progress of the calibration of the model of the bridge or building;

measuring, by the one or more sensors, during an operational phase when the bridge or building is subject to one or more unidentified external structural loads, responses to the one or more unidentified external structural loads;

searching, by the analysis software package during the operational phase using the calibrated model of the bridge or building, for a set of external structural loads that minimize a discrepancy between the measured responses to the one or more unidentified external structural loads from the one or more sensors and modeled responses produced from the calibrated model in the operational phase, wherein the searching includes:

generating a set of proposed external structural loads, producing modeled responses to the set of proposed external structural loads using the calibrated model, measuring the discrepancy between the measured responses to the one or more unidentified external structural loads and the modeled responses from the calibrated model, evolving the set of proposed external structural loads over a plurality of iterations that reduce the discrepancy, and iteratively repeated the generating, the producing, the measuring, and the evolving until a stopping criteria is reached, displaying on the display screen on the electronic device indications of the set of external structural loads as identified external structural loads on the bridge or building; and determining, based on the displayed identified external structural loads, whether the identified external structural loads are compliant with limits for the bridge or building to ensure safety of the bridge or building.

\* \* \* \* \*